(12) United States Patent
Stanjek

(10) Patent No.: US 8,114,233 B2
(45) Date of Patent: Feb. 14, 2012

(54) METHOD FOR ADHESIVE BONDING WITH FOAMABLE MIXTURES CONTAINING ALKOXYSILANE-TERMINATED PREPOLYMERS

(75) Inventor: Volker Stanjek, Ampfing (DE)

(73) Assignee: Wacker Chemie AG, Munich (DE)

( * ) Notice: Subject to any disclaimer, the term of this patent is extended or adjusted under 35 U.S.C. 154(b) by 350 days.

(21) Appl. No.: 12/513,600

(22) PCT Filed: Nov. 13, 2007

(86) PCT No.: PCT/EP2007/062261
§ 371 (c)(1),
(2), (4) Date: May 5, 2009

(87) PCT Pub. No.: WO2008/058955
PCT Pub. Date: May 22, 2008

(65) Prior Publication Data
US 2010/0078117 A1 Apr. 1, 2010

(30) Foreign Application Priority Data
Nov. 16, 2006 (DE) .......................... 10 2006 054 155

(51) Int. Cl.
*B32B 37/14* (2006.01)
(52) U.S. Cl. ........................................ 156/78; 156/327
(58) Field of Classification Search .................. 156/329, 156/327, 312, 77, 78; 528/12, 25, 31, 33; 521/154
See application file for complete search history.

(56) References Cited

U.S. PATENT DOCUMENTS

| | | | |
|---|---|---|---|
| 6,207,766 B1 | 3/2001 | Doi et al. | |
| 2004/0072921 A1 | 4/2004 | Stanjek et al. | |
| 2004/0204539 A1 | 10/2004 | Schindler et al. | |
| 2005/0234144 A1 | 10/2005 | Bachon et al. | |
| 2005/0260401 A1 | 11/2005 | Bachon et al. | |
| 2006/0247407 A1 | 11/2006 | Bachon et al. | |
| 2007/0100111 A1 | 5/2007 | Stanjek et al. | |
| 2007/0167598 A1 | 7/2007 | Stanjek et al. | |
| 2010/0071849 A1* | 3/2010 | Knott et al. ................... | 156/329 |
| 2011/0042004 A1* | 2/2011 | Schubert et al. .............. | 156/329 |

FOREIGN PATENT DOCUMENTS

| | | |
|---|---|---|
| CN | 1711299 A | 12/2005 |
| DE | 19831285 A | 1/2000 |
| EP | 0372561 A2 | 6/1990 |
| EP | 1098920 B1 | 5/2002 |
| EP | 1363960 B1 | 10/2004 |
| EP | 1421129 B1 | 6/2005 |
| JP | 59172577 A | 9/1984 |
| JP | 2006-506493 A | 2/2006 |
| WO | 9634030 A | 10/1996 |
| WO | 0037533 A | 6/2000 |
| WO | 0234838 A1 | 5/2002 |
| WO | 2004046218 A | 6/2004 |
| WO | 2004046218 A1 | 6/2004 |
| WO | 2005000931 A1 | 1/2005 |
| WO | 2005003201 A2 | 1/2005 |

* cited by examiner

*Primary Examiner* — Linda L Gray
(74) *Attorney, Agent, or Firm* — Brooks Kushman P.C.

(57) ABSTRACT

Surfaces are adhesively bonded by employing a highly reactive alkoxysilyl-functional foamable mixture, and pressing the surfaces together with the foam prepared from the foamable mixture between the surfaces.

8 Claims, No Drawings

METHOD FOR ADHESIVE BONDING WITH FOAMABLE MIXTURES CONTAINING ALKOXYSILANE-TERMINATED PREPOLYMERS

CROSS-REFERENCE TO RELATED APPLICATION

This application is the U.S. national phase of PCT Appln. No. PCT/EP2007/062261 filed Nov. 13, 2007 which claims priority to German application DE 10 2006 054 155.3 filed Nov. 16, 2006.

BACKGROUND OF THE INVENTION

1. Field of the Invention

The invention relates to a method for adhesive bonding of surfaces with a foam comprising a foamable mixture containing alkoxysilane-functional prepolymers.

The invention relates to a method for adhesive bonding of surfaces with a foam comprising a foamable mixture containing alkoxysilane-functional prepolymers, and to a foamable mixture.

2. Description of the Related Art

Prepolymer systems which have reactive alkoxysilyl groups have long been known and are often used for production of resilient sealants and adhesives in industry and the construction sector. In the presence of atmospheric moisture and suitable catalysts, these alkoxysilane-terminated prepolymers are capable, at as low as room temperature, of condensing with one another with elimination of alkoxy groups and formation of an Si—O—Si bond. Thus, these prepolymers can be used, inter alia, as one-component systems which have the advantage of simple handling since no second component has to be metered in and admixed.

A further advantage of alkoxysilane-functional prepolymers consists in the fact that neither acids nor oximes or amines are liberated on curing. Moreover, in contrast to isocyanate-based adhesives or sealants, there is no formation of gaseous $CO_2$, formation of which would subsequently expand the adhesive material after adhesive bonding of components. Furthermore, alkoxysilane-functional prepolymer mixtures are toxicologically safe, in contrast to isocyanate-based systems.

A particularly advantageous type of alkoxysilane-functional prepolymers comprises alkoxysilane-terminated prepolymers. These may be composed of different building blocks. Usually, these prepolymers have an organic backbone, i.e. they are composed, for example, of polyurethanes, polyethers, polyesters, polyacrylates, polyvinyl esters, ethylene-olefin copolymers, styrene-butadiene copolymers or poly-olefins, described, inter alia, in EP 0 372 561, WO 00/37533 or U.S. Pat. No. 6,207,766. However, systems whose backbone consists completely or at least partly of organosiloxanes are also widely used, described, inter alia, in WO 96/34030.

In a particularly advantageous preparation process for alkoxysilane-terminated prepolymers, starting materials used are polyols, for example polyether polyols or polyester polyols, which are reacted in a first reaction step with an excess of a di- or polyisocyanate. Thereafter, the isocyanate-terminated prepolymers obtained thereby are reacted with aminoalkyl-functional alkoxysilanes to give the desired alkoxysilane-terminated prepolymer. Alternatively, it is also possible to prepare alkoxysilane-terminated prepolymers by reacting a polyol or an OH-functional polyurethane, as can be prepared by the reaction of polyols with less than the stoichiometric amount of di- or polyisocyanates, with an isocyanatoalkyl-functional alkoxysilane. These preparation processes are described, for example, in EP 1 421 129 or WO 2005/000931. Further preparation processes, for example the reaction of aminofunctional polyols with carbamatoalkylalkoxysilanes, described in WO 02/34838, are also conceivable.

Furthermore, alkoxysilane-functional prepolymers having a poly(meth)acrylate backbone are also known. These are typically synthesized by copolymerization of (meth) acryloyloxyalkylalkoxysilanes with other (meth)acryloyl monomers and/or further unsaturated monomer building blocks, such as, for example, styrene.

In addition, alkoxysilane-functional polymers can also be prepared by subsequent grafting on of unsaturated alkoxysilanes, for example of vinyl- or (meth)acryloylsilanes.

In addition to a use as adhesive, use of alkoxysilane-functional prepolymers for the preparation of silane-crosslinking rigid and flexible foams, in particular of isocyanate-free sprayable construction foams, is also known and is described, for example, in EP 1 098 920 B1 or EP 1 363 960 B1. These spray foams are typically applied from spray cans and serve in particular for sealing of window joints, as filling and fixing material for door frames or generally for filling and sealing cavities in a structure. According to these applications, they are distinguished by as low a foam density as possible, i.e. as great a volume yield as possible per foam can and hence as high a productivity as possible. The low foam densities are achieved by application of as large an amount as possible of physical blowing agents, i.e. gas which is liquefied under pressure in the foam can and drives the foam formation during the spray process.

Such spray foams are unsuitable for use in conventional adhesive bonding applications in particular because they initially do not have any significant initial mechanical strength after their foaming and the workpieces to be adhesively bonded accordingly would have to be fixed over extremely long periods.

SUMMARY OF THE INVENTION

It is therefore an object of the present invention to overcome the disadvantages of the prior art. These and other objects are achieved by applying a foamable alkoxysilane-terminated prepolymer to a surface to be joined, and pressing this surface against a joinable surface, wherein a portion of the foam structure is destroyed.

DESCRIPTION OF THE PREFERRED EMBODIMENTS

The invention thus relates to a method for adhesive bonding of surfaces, in which a foamable mixture (M) which contains (A) prepolymers (A) having groups of the general formula [1]

$$\text{-A-(CH}_2)_x\text{—SiR}^1{}_a(\text{OR}^2)_{3-a} \qquad [1],$$

in which

A is a divalent binding group selected from —O—, —S—, —(R³)—, —NH—CO—O—, O—CO—NH, —NH—CO—N(R³)—, N(R³)—CO—NH, or a nitrogen atom which is part of a heterocycle, R¹ is an optionally halogen-substituted alkyl, cycloalkyl, alkenyl or aryl radical having 1-10 carbon atoms, R² is hydrogen, an alkyl radical having 1 to 6 carbon atoms or an ω-oxaalkyl alkyl radical having altogether 2-10 carbon atoms and $R^3$ is hydrogen, an optionally halogen-substituted cyclic, linear or branched $C_1$ to $C_{18}$-alkyl or alkenyl radical or a $C_6$ to $C_{18}$-aryl radical and x is a number from 1 to 10 and a is a number from 0 to 2, and (B) blowing agents (B)

is foamed on one of the surfaces to be adhesively bonded or between the surfaces to be adhesively bonded to give a foam (MS) or the foam (MS) which can be prepared from the mixture (M) is applied after foaming on one of the surfaces to be adhesively bonded or between the surfaces to be adhesively bonded, and the foam (MS) is then pressed between the surfaces to be adhesively bonded.

The surfaces to be adhesively bonded are preferably pressed onto one another in the method. The application of the foamable mixture (M) is preferably effected from a pressurized can, the foam formation being effected by the blowing agent present in the mixture (M).

On pressing together the surfaces to be adhesively bonded, the structure of the foam (MS) is preferably at least substantially destroyed. Accordingly, when it has been pressed between two plane-parallel surfaces to be adhesively bonded, the foam (MS) preferably comprises less than 60%, based on its volume, more preferably less than 40%, based on its volume and most preferably less than 20%, based on its volume, of gas bubbles.

In a preferred embodiment, at least one of the surfaces to be adhesively bonded is moistened prior to the use of the foam (MS) according to the invention. Most preferably, one of the surfaces to be adhesively bonded is moistened while the foam (MS) is applied to the respective other surface. The foam (MS) is then pressed between both surfaces.

The invention is based on the surprising discovery that the foam (MS) has a surprisingly high initial strength if it is applied to one of the surfaces to be adhesively bonded and then pressed by strongly pressing these surfaces one onto the other. This distinguishes it very fundamentally from the sprayable assembly foams which are described in the prior art and, which due to their very low density, have only a low initial mechanical strength. The initial adhesive power of the foam (MS) on the other hand is such—assuming sufficient adhesion to the respective surfaces—preferably already so great even after not more than 10 min, preferably after 5 min and most preferably after only 2 or 1 min, that the adhesive joint can be loaded with a permanent tensile stress (tensile force perpendicular to the adhesively bonded surface) and/or a shear stress (tensile force parallel to the adhesively bonded surface) of 500 N/m², preferably of at least 1000 N/m² and more preferably of at least 1500 N/m².

The high initial strength of the foam (MS) is attributable to a phenomenon which is also surprising to the person skilled in the art. Thus, the adhesive power of the foam (MS)—in contrast to conventional silane-crosslinking adhesives—is established not only by the chemical silane crosslinking. Instead, apart from this chemical curing process, a remarkable physical effect is additionally found here, as is otherwise known only for contact adhesives where the buildup of strength takes place only through the evaporation of added solvents. In the case of the foam (MS), the function os these solvents is performed by the blowing agent or the blowing agent mixture. In contrast to the only very slowly curing contact adhesives, however, the blowing agents do not evaporate gradually but for the most part do so abruptly even during foaming of the foamable mixture (M), rather, they expand to give the foam (MS), the foam (MS) surprisingly remaining extremely mobile in spite of a very high viscosity after evaporation of the blowing agent, so that the foam (MS) can be readily compressed by pressing together the surfaces to be adhesively bonded. On compression of the foam (MS), a uniform and thin adhesive layer forms between the surfaces to be adhesively bonded, and the surfaces are thoroughly wetted so that an optimum adhesive effect can be achieved. This is then further reinforced by the chemical curing reactions taking place.

A further completely surprising effect is moreover the fact that undesired residues of foam (MS) as form, for example, when excess amounts of foam (MS) are pressed out of the adhesive joint on pressing together the surfaces to be adhesively bonded, can be comparatively easily removed. Evidently, surface wetting and adhesion of the foam (MS) are substantially reduced in areas where the foam structure is not compressed and hence not destroyed.

Most preferably, the foamable mixture (M) contains highly reactive prepolymers (A), for example prepolymers having silane functions of the general formula [1] where X = 1, and/or suitable catalysts, so that the foamable adhesive has a tack-free time of <20 min, preferably <10 min and most preferably <5 or <2 min. Here, a further surprising effect is found. Thus, such highly reactive foams (MS) retain their adhesive power even when the time between the complete or only partial application of the foam (MS) and the joining of the workpieces to be adhesively bonded is of the order of magnitude of the tack-free time or even longer. Conventional silane-crosslinking adhesives are literally "nontacky" after this time interval. The processing of highly reactive conventional adhesives is accordingly difficult and not very convenient. On the other hand, highly reactive foams (MS) have dramatically increased processing times. Evidently, the foam (MS) retains its mobility based on the fine foam structure and associated ability for surface wetting under pressure even when the applied foam (MS) has superficially formed a nontacky layer which, however, splits on compressing the foam (MS) between the workpieces to be adhesively bonded, with the result that still uncrosslinked prepolymers (A) are released and brought into contact with the surfaces to be adhesively bonded.

The high initial adhesive power of the foam (MS) is promoted by as high a foam density as possible.

The foamable mixture (M) which contains the above prepolymers (A) having groups of the general formula [1] preferably has less than 15% by weight of blowing agent, based on the total mixture (M).

Preferably, the content of the blowing agent (B), based on the total mixture (M) is not more than 10% by weight, more preferably not more than 7% by weight.

Preferred radicals $R^1$ are methyl, ethyl or phenyl groups. Radicals $R^2$ are preferably methyl or ethyl groups and radical $R^3$ is preferably hydrogen, an alkyl radical having 1-4 carbon atoms, or a cyclohexyl or phenyl radical. A is preferably a urethane or urea group of the formula —NH—CO—O—, —CO—NH, —NH—CO—N($R^3$)— or N($R^3$)—CO—NH. a is preferably 0 or 1 while the numbers 1 or 3 are preferred for x.

Most preferably, x is 1, i.e. the groups are alkoxysilyl groups which are separated only by a methyl spacer from a heteroatom having at least one free electron pair. As a result, these prepolymers have an extremely high reactivity to (atmospheric) humidity, so that they can be processed to give polymer mixtures which cure also with little or even no heavy metal-containing catalysts, in particular no tin catalysts. Moreover, the foams (MS) which can be prepared from these prepolymers cure at as low as room temperature at very high speed so that they develop a high adhesive power in a very short time. The workpieces adhesively bonded with such materials have to be fixed only for an extremely short time, preferably less than 5 min.

The main chains of the alkoxysilane-terminated prepolymers (A) may be branched or straight-chain, straight or only slightly branched main chains being preferred. The average chain lengths can be adapted as desired, depending on the respective desired properties both of the uncrosslinked mixture (M) and of the cured material. The prepolymers (A) are preferably liquid or viscous at room temperature and preferably have viscosities of from 1 to 1000 Pas, preferably 10-700 Pas and most preferably from 50 to 500 Pas.

The prepolymers (A) are preferably composed of silanes (S), polyols (P) and optionally di- or polyisocyanates (I).

Preferably silanes (S) are compounds of the general formulae [2] and [3]

$$OCN-(CH_2)_x-SiR^1{}_a(OR^2)_{3-a} \qquad [2]$$

$$Z-(CH_2)_x-SiR^1{}_a(OR^2)_{3-a} \qquad [3],$$

in which

Z is an OH—, SH— or an NHR$^3$ group and the other variables have the meanings stated above.

The silanes (S) of the general formula [2], are preferably reacted with polyols (P) or isocyanate-reactive reaction products of polyols (P) and poly- or diisoxyanates (I). In the last-mentioned case, the sequence of the reaction steps is arbitrary, i.e. the reaction of the silanes (S) according to the formula [2] with the polyols (P) can be effected before, after or simultaneously with the reaction between polyol (P) and the isocyanate (I).

With the use of silanes (S) of the general formula [3], these are reacted with NCO-terminated prepolymers, as are preferably obtainable by reaction of polyols (P) with isocyanates (I). Here too, the sequence of the individual reaction steps for the preparation of the prepolymer (A) is of course arbitrary. In principle, a continuous prepolymer preparation, for example in a tubular reactor, is also conceivable. Separate purification or other working-up of the prepolymers (A) is as a rule not required.

In principle, all polyols (PP) having at least one hydroxyl group, preferably having at least two hydroxyl groups, and having an average molecular weight $M_n$ of from 200 to 30,000 can be used as polyols (PP) for the preparation of the prepolymers (A). These may be, for example, hydroxyl-functional polyethers, polyesters, polyacrylates and polymethacrylates, polycarbonates, polystyrenes, polysiloxanes, polyamides, polyvinyl esters, polyvinyl hydroxides, or polyolefins, for example, polyethylene, polybutadiene, ethylene-olefin copolymers or styrene-butadiene copolymers. Polyols (PP) preferably have an average molecular weight $M_n$ of from 400 to 25,000, more preferably from 1000 to 20,000. Particularly suitable polyols (PP) are aromatic and/or aliphatic polyester polyols and polyether polyols, as often described in the literature. The polyethers and/or polyesters used as polyols (PP) may be either linear or branched, but straight-chain, linear polyols are preferred. In addition, polyols (PP) may also have substituents, such as, for example, halogen atoms. Of course, the use of any desired mixtures of the various polyol types is also possible. However, linear polyether polyols having two hydroxyl groups are most preferably used as polyols (PP). Polypropylene glycols are particularly suitable.

Furthermore, all monomeric alcohols (PM) having at least one, preferably at least two or more, OH functions and also hydroxyalkyl- or aminoalkyl-terminated polysiloxanes (PS) can also be used as polyols (P). Of course, all mixtures of polymeric polyols (PP), monomeric alcohols (PM) and polysiloxanes (PS) can also be used as polyol component (P).

Compounds such as ethylene glycol, glycerol, the various propanediol, butanediol, pentanediol or hexanediol isomers, the various pentoses and hexoses and derivatives thereof and also pentaerythritol, may be mentioned as examples of monomeric alcohols (PM) having at least two OH functions. Preferably used hydroxyalkyl- or aminoalkyl-terminated polysiloxanes (PS) are compounds of the general formula [4]

$$Z-R^5-[Si(R^4)_2-O-]_n-Si(R^4)_2-R^5-Z \qquad [4]$$

in which $R^4$ is a hydrocarbon radical having 1 to 12 carbon atoms, preferably methyl radicals, $R^5$ is a branched or straight hydrocarbon chain having 1-12 carbon atoms, preferably propylene chain, and n is a number from 1 to 2000, preferably a number from 5 to 100, and z has the above meanings.

In principle, all customary isocyanates, as are often described in the literature, can be used as di- or polyisocyanates (I) for the preparation of the isocyanate-functional prepolymers (A). Conventional diisocyanates are, for example, diisocyanatodiphenyl-methane (MDI), both in the form of crude or industrial MDI and in the form of pure 4,4' or 2,4' isomers or mixtures thereof, toluene diisocyanate (TDI) in the form of its various regioisomers, diisocyanato-naphthalene (NDI), isophorone diisocyanate (IPDI), perhydrogenated MDI (H-MDI) or hexamethylene diisocyanate (HDI). Examples of polyisocyanates are the polymeric MDI (P-MDI), triphenylmethane triisocyanate or the isocyanurate or biuret trimers of the abovementioned monomeric diisocyanates. All di- and/or polyisocyanates can be used individually or as mixtures. Preferably, however, exclusively diisocyanates are used. If the UV stability of the prepolymers (A) or of the cured materials prepared from these prepolymers is important because of the respective use, aliphatic isocyanates are preferably used as component (I).

In a preferred embodiment of the invention, aromatic isocyanates are used as isocyanate components (I) and compounds of the formula [3] where x=1 are used as silane component (S). Most preferably, Z is an NHR$^3$ group. The prepolymers (A) obtained thereby are surprisingly distinguished by an even higher reactivity—even in comparison with other prepolymers (A) having silane functions of the formula [1] where x=1 which are in any case highly reactive. Thus, these specific extremely highly reactive prepolymers themselves have as a rule a tack-free time of <10 min, typically <5 min, without addition of a separate catalyst.

The preparation of the prepolymers (A) is preferably effected by simple combination of the components described, if appropriate a catalyst can also be added and/or the procedure can be effected at elevated temperature.

The concentrations of all isocyanate groups participating in all reaction steps and all isocyanate-reactive groups and the reaction conditions are preferably chosen so that all isocyanate groups react in the course of the prepolymer synthesis. The finished prepolymer (A) is thus preferably isocyanate-free. Furthermore, the concentration ratios and the sequence of the reaction steps and the reaction conditions are preferably chosen so that virtually all chain ends of the prepolymers (A), preferably >80% of the chain ends, and most preferably >90% of the chain ends are terminated with alkoxysilyl groups of the general formula [1].

The reactions occurring in the preparation of the prepolymers (A) between isocyanate groups and isocyanate-reactive groups can, if appropriate, be accelerated by a catalyst (K).

For this purpose, the organic tin compounds usually used, such as, for example, dibutyltin dilaurate, dioctyltin dilaurate, dibutyltin diacetylacetonate, dibutyltin diacetate or dibutyltin dioctanoate, etc. can be used. Furthermore, bismuth catalysts, for example the Borchi catalyst, titanates, e.g. titanium(IV) isopropylate, iron(III) compounds, e.g. iron(III) acetylacetonate, or amines, e.g. triethylamine, tributylamine, 1,4-diazabicyclo[2.2.2]octane, 1,8-diazabicyclo[5.4.0]undec-7-ene, 1,5-diazabicyclo[4.3.0]non-5-ene, N,N-bis(N,N-dimethyl-2-aminoethyl)methylamine, N,N-dimethylcyclo-hexylamine, N,N-dimethylphenylamine, N-ethylmorpholinine, etc., may also be used. Organic or inorganic Brönsted acids, such as acetic acid, trifluoroacetic acid or benzoyl chloride, hydrochloric acid, phosphoric acid, the mono- and/or diesters thereof, such as, for example, butyl phosphate, (iso)propyl phosphate, dibutyl phosphate, etc., are also suitable as catalysts (K). Of course, combinations of a plurality of catalysts can also be used.

A further process for the preparation of alkoxysilane-functional prepolymers (A) is the copolymerization of silanes having at least one unsaturated group, for example of vinylsilanes or (meth)acryloxyalkylsilanes, with other (meth)acryl monomers and/or further unsaturated monomer building blocks, such as, for example, styrene. In addition, the prepolymers (A) may also be prepared by subsequent grafting-on of unsaturated alkoxysilanes, for example of vinyl- or (meth)acryloxyalkylsilanes. The corresponding processes both for copolymerization and for grafting are known and are widely described in the relevant literature.

Blowing agents (B) which are suitable are the same gases condensable even at relatively low pressures which are also used for the preparation of sprayable assembly foams. Suitable blowing agents are, for example, hydrocarbons having in each case 1-5, in particular 3-5, carbon atoms, in particular propane-butane mixtures or isobutane, fluorohydrocarbons having 1-5 carbon atoms, e.g. 1,1,1,2-tetrafluoroethane or 1,1-difluoroethane, or dimethyl ether and corresponding mixtures. The content of blowing agent is preferably <10% by weight, more preferably <7 or <5% by weight, based on the total mixture (M).

As further components (C), the mixtures (M) can preferably contain further silanes (S1), fillers (F), solvents (L), foam stabilizers (Stab) and catalysts (K1) for accelerating the curing of the foam (MS).

In principle, all silanes can be used as further silanes (S1), but silanes having hydrolyzable alkoxy groups are preferred. In a particularly preferred embodiment of the invention, the silanes (S1) or at least portions of the silanes (S1) are identical to the silanes (S) used in the prepolymer preparation. In this case, the silane (S) is advantageously used in excess during the synthesis of the prepolymers (A). This procedure, including the associated advantages in particular in the preparation of prepolymers (A) having silane functions corresponding to the formula [1] where x=1, is described in WO 2005/003201.

The silanes (S1) can perform a plurality of functions. Thus, they can serve, for example, as water scavengers, i.e. they should trap any traces of moisture present and thus increase the storage stability of the corresponding silane-crosslinking materials. Of course, these must have at least a comparably high reactivity to traces of moisture as the prepolymer (A). Suitable water scavengers are therefore in particular highly reactive alkoxysilanes corresponding to the formula [3] where x=1. Particularly preferred water scavengers are carbamatomethyltrialkoxysilanes and carbamatomethylmethyl-dialkoxysilanes, the methoxy and ethoxy derivatives of these silane types being particularly preferred.

Furthermore, the low molecular weight alkoxysilanes (S1) may also be a crosslinking agent and/or reactive diluent. The alkoxysilanes (S1) could contribute to an increase in the network density and hence to an improvement in the mechanical properties, e.g. the tensile strength, of the cured material. Moreover, they can also lower the viscosity of the corresponding prepolymer mixtures. These functions can be performed in principle by all alkoxysilanes. Economical silanes, for example the economical alkyltrimethoxysilanes, such as methyltrimethoxysilane and vinyl- or phenyl-trimethoxysilane, and the partial hydrolysis products thereof are therefore particularly suitable.

In addition, the low molecular weight alkoxysilanes (S1) can also perform the function of an adhesion promoter. In particular, alkoxysilanes which have amino functions or epoxy functions can be used here. γ-amino-propyltrialkoxysilanes, γ-[N-aminoethylamino]propyl-trialkoxysilanes, γ-glycidyloxypropyltrialkoxysilanes and all silanes corresponding to the formula [3], in which Z is a nitrogen-containing group, may be mentioned as examples. Further preferred silanes are silanes of the general formula [5]

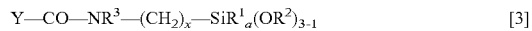

$$Y-CO-NR^3-(CH_2)_x-SiR^1_a(OR^2)_{3-1} \quad [3]$$

in which Y is an $OR^3-$, $NHR^3-$ or $N(R^3)_2-$ group and all other variables have the abovementioned meaning.

Finally, the low molecular weight alkoxysilanes (S1) can even serve as curing catalysts or curing cocatalysts. In particular, all basic aminosilanes, for example all silanes of the general formula [3], are suitable for this purpose provided that Z is an $NH_2-$, $NHR^3-$ or $N(R^3)_2-$ group.

The alkoxysilanes (S1) can be added to the prepolymers (A) at any time. If they have no NCO-reactive groups, they can even be added during the synthesis of the prepolymers (A). Based on 100 parts by weight of prepolymer (A), up to 100 parts by weight, preferably from 1 to 60 parts by weight, of a low molecular weight alkoxysilane (S1) can be added.

In addition to the silanes (S1), the mixtures (M) often contain added fillers (F) as further components. The fillers (F) lead to a considerable improvement in the properties of the resulting mixtures. Particularly the tensile strength as well as the elongation at break can be considerably increased by the use of suitable fillers. Customary fillers (F) are, for example, calcium carbonate, pyrogenic silica and carbon black. The different fillers (F) are often also used in combination. Suitable fillers (F) are all materials as are often described in the prior art. The fillers (F) are preferably used in a concentration of 0-90% by weight, based on the finished mixture (M), concentrations of 5-70% by weight being particularly preferred.

The mixtures (M) can moreover contain organic solvents (L), preferably in small amounts of <10% by weight, based on the total mixture (M), amounts of <5% by weight being particularly preferred. These solvents serve for reducing the viscosity of the uncrosslinked mixtures (M). Suitable solvents (L) are in principle all solvents and solvent mixtures. Preferably used solvents (L) are compounds which have a dipole moment. Particularly preferred solvents have a heteroatom with free electron pairs which can form hydrogen bridge bonds. Preferred examples of such solvents are ethers, such as, for example, tert-butyl methyl ether, esters, such as, for example, ethylacetate or butyl acetate, and alcohols, such as, for example, methanol, ethanol and the various regioisomers of propanol and of butanol.

In order to achieve rapid curing of the foams (MS) at room temperature, a curing catalyst (K1) can optionally be added. In principle, the same compounds which have already been described as catalysts (K) in the case of the preparation of the prepolymers (A) are suitable here. In a preferred embodiment of the invention, the catalysts (K) used in the prepolymer preparation simultaneously also serve as curing catalysts (K1). The foam stabilizers (Stab) which may be used are the same compounds which are also used for the preparation of conventional assembly foams. They are commercially available in a large selection widely described in the literature.

Furthermore, the mixtures (M) may also contain auxiliaries known per se, such as water scavengers, adhesion promoters and/or reactive diluents differing from the components (S1) and plasticizers, e.g. phthalates, benzoates, phosphate plasticizers, thixotropic agents, fungicides, flame proofing agents, pigments, etc. Light stabilizers, antioxidants, free radical scavengers and further stabilizers may also be added to the mixtures (M). Such additives are as a rule indispensable for producing the respective desired property profiles, both of the uncrosslinked mixtures (M) and of the cured materials.

For the mixtures (M), there are countless different applications in the area of adhesives, sealants and joint sealants. They are suitable for countless different substrates, such as, for example, mineral substrates, metals, plastics, glass, ceramic, etc. In principle, the foams (MS) are suitable for adhesive bonding of any articles. In particular, however, they are very suitable if the surfaces to be adhesively bonded are uneven. This is the case, for example, in the adhesive bonding of fractured areas which no longer fit exactly one on top of the other owing to splintering or bending of material, or in the adhesive bonding of base boards, sealing strips or other ornamentations on an uneven wall surface. Here, the foams (MS) have the advantage of also being able to thoroughly fill cavities.

The mixtures (M) are preferably used as foamable adhesives, most preferably as 1-component foamable adhesives which cure on contact with atmospheric humidity and/or water.

All above symbols of the above formulae have their meanings in each case independently of one another. In all the formulae the silicon atom is tetravalent.

Unless stated otherwise, all quantity and percentage data in the following examples are based on weight, all pressures are 0.10 MPa (abs.) and all temperatures are 20° C.

As a measure of the reactivities of the prepolymers (A), the tack-free time is variously stated. This is to be understood as meaning the time span which elapses after exposure of the prepolymer to the air before the polymer surface has cured to such an extent that, after touching this surface with a pencil, neither polymer material remains adhering thereto nor string formation occurs.

EXAMPLE 1

Preparation of a Prepolymer (A)

600 g (75 mmol) of a polypropylene glycol having an average molecular weight $M_n$ of 8000 g/mol (Acclaim® 8000 from Bayer) are initially introduced into a 1 l reaction vessel having stirring, cooling and heating facilities and are dewatered for 60 minutes at 80° C. in vacuo. Thereafter, argon is admitted, the heating is removed and 37.5 g (150 mmol) of monomeric 4,4'-MDI and 0.035 g of Borchi catalyst are added under inert gas and with vigorous stirring. Stirring is then effected for 120 minutes at 80° C. The NCO-terminated polyurethane prepolymer obtained is then cooled to 60° C., 65.87 g (240 mmol) of N-cyclohexylaminomethyltriethoxysilane (GENIOSIL® XL 926 from Wacker) are added and stirring is effected for 60 min at 60° C. In the resulting prepolymer mixture, isocyanate groups are no longer detectable via IR spectroscopy. A slightly turbid prepolymer which, with a viscosity of 298 Pas, can be easily further processed at 20° C. is obtained.

EXAMPLE 2

Preparation of a Mixture (M) According to the Invention 60 g of the prepolymer prepared according to Example 1 and 1.44 g of the foam stabilizer Tegostab® B8443 (product of Goldschmidt) are weighed into a conventional pressure can having a capacity of about 100 ml. The can is then closed with a conventional valve, as also used in the case of pressure cans for conventional sprayable assembly foams. 3 ml of propane/butane and 3 ml of dimethyl ether are added as blowing agents. The can is then shaken well. The can is preferably stored upside down.

EXAMPLE 3

Application of the Mixture (K) According to the Invention

The foamable mixture (M) prepared according to Example 2 is sprayed onto two wood test specimens having an adhesion surface measuring 3×9 cm. Of these, one is then adhesively bonded to a cleaned surface coated with conventional wall paint and the other adhesively bonded to a wood surface. The adhesion surfaces are pressed firmly against one another for a few seconds in each case. After about 1 min, pressure is exerted a second time for a few seconds.

After 2 min, the adhesion surfaces are permanently loaded with a tensile stress of 5 N without the adhesion bond being broken.

The experiment is repeated exactly, except that the adhesion surfaces are permanently loaded this time after 3 min with a shear stress of 5 N. No detectable shifting between the adhesively bonded surfaces occurs.

EXAMPLE 4

Preparation of a Prepolymer (A)

487.8 g (2.8 mol) of monomeric TDI (80/20 mixture of 2,4- and 2,6-TDI) are initially introduced into a 2 l reaction vessel having stirring, cooling and heating facilities and are heated to 80° C. Thereafter, 1 g of phosphoric acid and 595.0 g (1.4 mol) of a polypropylene glycol having an average molecular weight of 425 g/mol are added within about 45 min under inert gas and with vigorous stirring, the mixture warming up by about 20° C. in spite of cooling in an ice bath. Stirring is effected for a further 60 min at 80° C. The NCO-terminated polyurethane prepolymer obtained is cooled to 70° C. and 1.8 g of Jeffcat® DMDLS (product of Huntsman) and 90.0 g of vinyltrimethoxysilane (GENIOSIL® XL 10 from Wacker) are added. 562.1 g (2.66 mol) of N-phenylaminomethylmethyldimethoxysilane (GENIOSIL® XL 972 from Wacker) are then added within 90 min with cooling, the temperature remaining below 75° C. Stirring is continued for a further 60 min at 70° C. Isocyanate groups are no longer detectable in the resulting prepolymer mixture by IR spectroscopy. A clear prepolymer which, with a viscosity of 512 Pas, can be easily further processed at 20° C. is obtained.

EXAMPLE 5

Preparation of a Mixture (M) According to the Invention 50 g of the prepolymer prepared according to Example 4, 1.2 g of the foam stabilizer Tegostab® B8443 (product of Goldschmidt) and 0.3 g of butyl phosphate are weighed into a conventional pressure can having a capacity of about 100 ml. The can is then closed with a conventional valve, as also used in the case of pressure cans for conventional sprayable assembly foams. 2 ml of propane/butane and 2 ml of dimethyl ether are added as blowing agents. The can is then shaken well. The can is preferably stored upside down.

EXAMPLE 6

Application of the Mixture (M) According to the Invention

The mixture (M) foamable according to Example 5 is sprayed onto two wood test specimens having an adhesion surface measuring 3×9 cm. Of these, one is then adhesively bonded to a cleaned surface coated with conventional wall paint and the other adhesively bonded to a wood surface. The adhesion surfaces are pressed firmly against one another for a few seconds in each case. After about 1 min, pressure is exerted a second time for a few seconds.

After 2 min, the adhesion surfaces are permanently loaded with a tensile stress of 5 N without the adhesion bond being broken.

The invention claimed is:

1. A method for adhesive bonding of surfaces, comprising applying to at least one of said surfaces a foamable mixture (M) comprising
    (A) at least one prepolymer (A) having groups of the formula [1]

    $$-A\text{-}(CH_2)_x\text{—}SiR^1{}_a(OR^2)_{3-a} \quad [1],$$

in which
    A is a divalent binding group selected from —O—, —S—, —(R$^3$)—, —NH—CO—O—, O—CO—NH, —NH—CO—N(R$^3$)—, N(R$^3$)—CO—NH, or a nitrogen atom which is part of a heterocycle,
    R$^1$ is an optionally halogen-substituted alkyl, cycloalkyl, alkenyl or aryl radical having up to 10 carbon atoms,
    R$^2$ is hydrogen, an alkyl radical having 1 to 6 carbon atoms or an ω-oxaalkyl alkyl radical having altogether 2-10 carbon atoms and
    R$^3$ is hydrogen, an optionally halogen-substituted cyclic, linear or branched C$_1$ to C$_{18}$ alkyl or alkenyl radical or a C$_6$ to C$_{18}$ aryl radical,
    x is a number from 1 to 10,
    a is a number from 0 to 2, and
    (B) at least one blowing agent (B), and
foaming the foamable mixture (M) on at least one of said surfaces to be adhesively bonded or between said surfaces to be adhesively bonded to give a foam (MS), or applying a foam (MS) which has been prepared from the mixture (M) to at least one of said surfaces to be adhesively bonded or between the surfaces to be adhesively bonded, the foam (MS) having a foam structure comprising gas bubbles, and pressing the foam (MS) between the surfaces to be adhesively bonded, wherein the foam structure of the foam (MS), when it has been pressed between the surfaces to be adhesively bonded, is destroyed in part, such that the foam, after pressing, comprises less than 60% of gas bubbles, based on its volume, and curing the foam.

2. The method of claim 1, wherein x is the number 1.

3. The method of claim 1, wherein the foamable mixture (M) comprises at least one further component (C) selected from the group consisting of silanes (S1), fillers (F), solvents (L), foam stabilizers (Stab) and catalysts (K1) for accelerating the curing of the foam (MS).

4. The method of claim 3, wherein the fillers (F) are selected from the group consisting of calcium carbonate, pyrogenic silica, carbon black, and mixtures thereof.

5. The method of claim 1, wherein the at least one blowing agent (B) is present in an amount of less than 10% by weight based on the total weight of the foamable mixture (M).

6. The method of claim 1, wherein the at least one blowing agent (B) is present in an amount of less than 5% by weight based on the total weight of the foamable mixture (M).

7. The method of claim 1, wherein after pressing, the foam structure contains less than 40% gas bubbles based on its volume.

8. The method of claim 1, wherein after pressing, the foam structure contains less than 20% gas bubbles based on its volume.

* * * * *